US012587477B2

(12) United States Patent
Xie et al.

(10) Patent No.: US 12,587,477 B2
(45) Date of Patent: Mar. 24, 2026

(54) BIER PACKET FORWARDING METHOD, DEVICE, AND SYSTEM

(71) Applicant: Huawei Technologies Co., Ltd., Shenzhen (CN)

(72) Inventors: Jingrong Xie, Beijing (CN); Fanghong Duan, Nanjing (CN); Xuesong Geng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 18/327,541

(22) Filed: Jun. 1, 2023

(65) Prior Publication Data

US 2023/0318974 A1     Oct. 5, 2023

Related U.S. Application Data

(63) Continuation of application No. PCT/CN2021/133370, filed on Nov. 26, 2021.

(30) Foreign Application Priority Data

Dec. 2, 2020   (CN) .......................... 202011393273.9
Dec. 22, 2020   (CN) .......................... 202011525228.4

(51) Int. Cl.
| | |
|---|---|
| *H04L 45/741* | (2022.01) |
| *H04L 12/46* | (2006.01) |
| *H04L 45/16* | (2022.01) |

(52) U.S. Cl.
CPC ........ *H04L 45/741* (2013.01); *H04L 12/4641* (2013.01); *H04L 45/16* (2013.01)

(58) Field of Classification Search
None
See application file for complete search history.

(56) References Cited

U.S. PATENT DOCUMENTS

2020/0412562 A1 * 12/2020 Peng ....................... H04L 45/16

FOREIGN PATENT DOCUMENTS

| EP | 3734906 A1 | 11/2020 |
|---|---|---|
| WO | 2020088696 A1 | 5/2020 |

OTHER PUBLICATIONS

Z. Zhang et al:"EVPN BUM Using BIER draft-ietf-bier-evpn-03." Apr. 16, 2020. total 14 pages.

(Continued)

*Primary Examiner* — Saad Khawar
(74) *Attorney, Agent, or Firm* — Slater Matsil, LLP

(57) ABSTRACT

A first network device receives a BIER packet sent by a second network device. The BIER packet includes a data packet and a global VPN identifier, the global VPN identifier is for uniquely identifying, in a BIER domain, a VPN to which a source device of the data packet belongs, the global VPN identifier includes an identifier of the second network device and a first identifier, and the first identifier is for identifying, on the second network device, the VPN to which the source device of the data packet belongs. The first network device determines, based on the global VPN identifier, a first VPN corresponding to the global VPN identifier. The first network device sends the data packet to the destination device of the data packet corresponding to the first VPN.

20 Claims, 8 Drawing Sheets

A first network device receives a BIER packet sent by a second network device, where the BIER packet includes a data packet and a global virtual private network VPN identifier — 510

The first network device determines, based on the global VPN identifier, a first VPN corresponding to the global VPN identifier — 520

The first network device sends the data packet to a destination device of the data packet corresponding to the first VPN — 530

(56)         References Cited

OTHER PUBLICATIONS

E. Rosen, Ed et al:"Multicast VPN Using Bit Index Explicit
Replication (BIER)." ISSN: 2070-1721. Apr. 2018. total 17 pages.
Shaofu. Peng et al: "Global vpnid advertisement in BIER overlay
draft-pengzhang-bier-global-vpnid-00." Jun. 28, 2018. total 5 pages.

* cited by examiner

| BIFT-ID | | | | TC | S | TTL | | BIER header |
|---|---|---|---|---|---|---|---|---|
| Nibble (nibble) | | Ver | BSL | Entropy (entropy) | | | | |
| OAM | RSV | DSCP | Protocol (proto) | | BFIR-ID | | | |
| Bit string (bit string) | | | | | | | | |

| Ver | BSL | Entropy (entropy) | | BIER header |
|---|---|---|---|---|
| BFIR-ID | | SD | Protocol (proto) | |
| SI | Sub-domain (sub-domain) | RSV | TTL | |
| Bit string (bit string) | | | | |

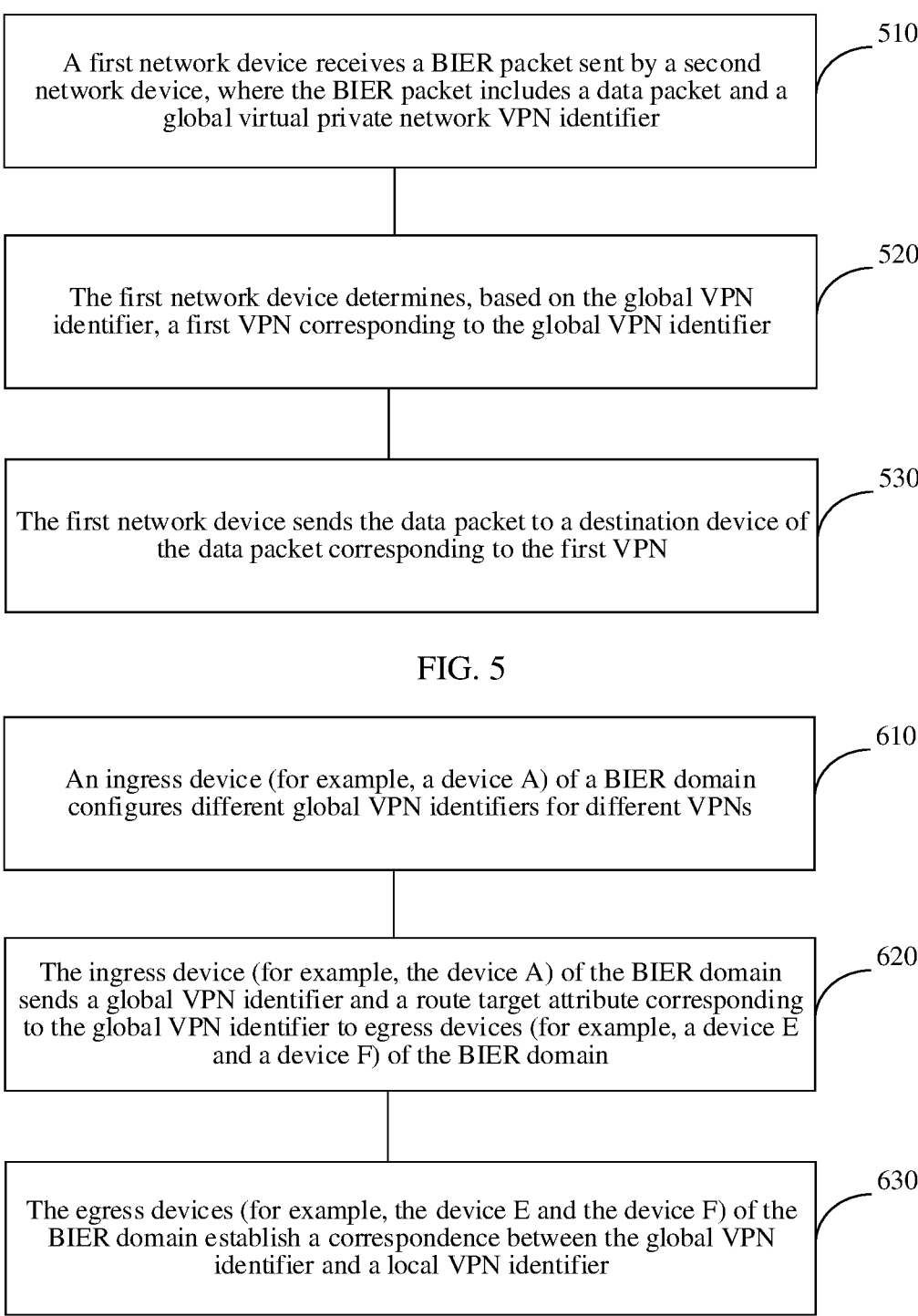

A first network device receives a BIER packet sent by a second network device, where the BIER packet includes a data packet and a global virtual private network VPN identifier
510

The first network device determines, based on the global VPN identifier, a first VPN corresponding to the global VPN identifier
520

The first network device sends the data packet to a destination device of the data packet corresponding to the first VPN
530

FIG. 5

An ingress device (for example, a device A) of a BIER domain configures different global VPN identifiers for different VPNs
610

The ingress device (for example, the device A) of the BIER domain sends a global VPN identifier and a route target attribute corresponding to the global VPN identifier to egress devices (for example, a device E and a device F) of the BIER domain
620

The egress devices (for example, the device E and the device F) of the BIER domain establish a correspondence between the global VPN identifier and a local VPN identifier
630

FIG. 6

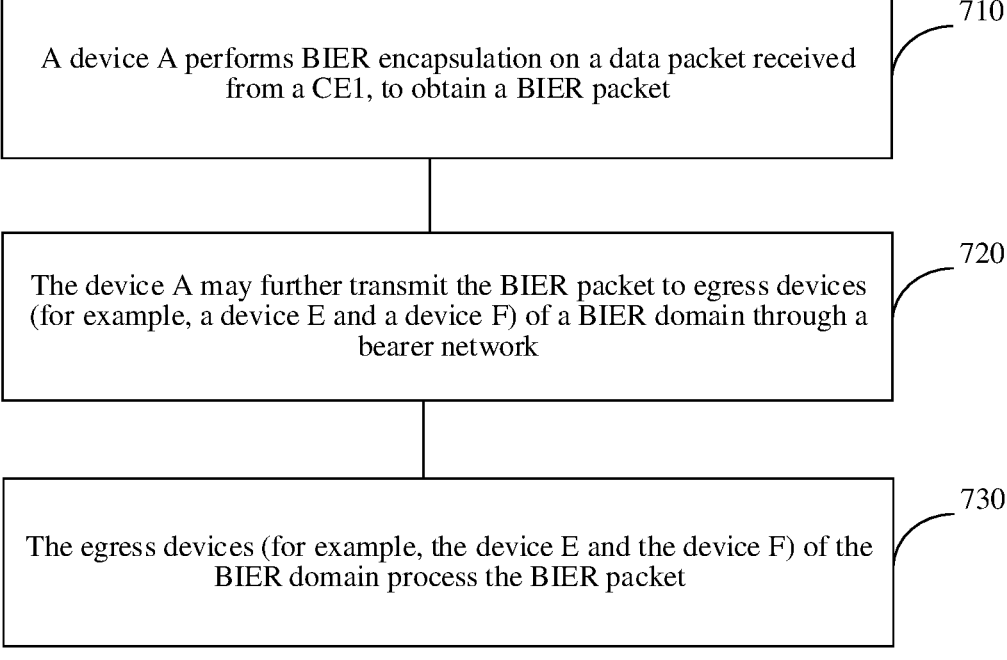

A device A performs BIER encapsulation on a data packet received from a CE1, to obtain a BIER packet — 710

The device A may further transmit the BIER packet to egress devices (for example, a device E and a device F) of a BIER domain through a bearer network — 720

The egress devices (for example, the device E and the device F) of the BIER domain process the BIER packet — 730

FIG. 7

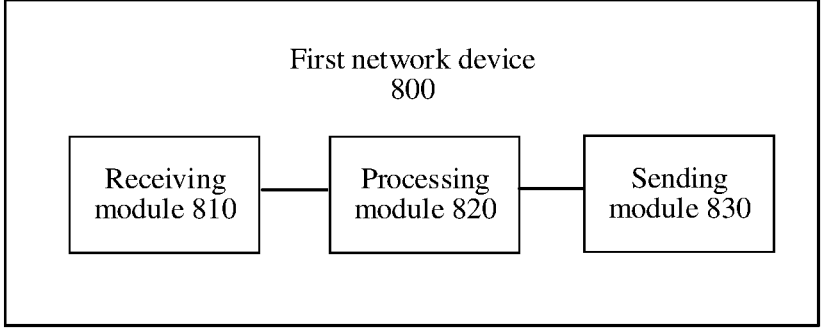

First network device
800

Receiving module 810 — Processing module 820 — Sending module 830

FIG. 8

BIER PACKET FORWARDING METHOD, DEVICE, AND SYSTEM

CROSS-REFERENCE TO RELATED APPLICATIONS

This application is a continuation of International Application No. PCT/CN2021/133370, filed on Nov. 26, 2021, which claims priorities to Chinese Patent Application No. 202011393273.9, filed on Dec. 2, 2020, and Chinese Patent Application No. 202011525228.4, filed on Dec. 22, 2020. All of the aforementioned patent applications are hereby incorporated by reference in their entireties.

TECHNICAL FIELD

This application relates to the field of network communications, and more specifically, to a BIER packet forwarding method, a device, and a system.

BACKGROUND

An internet protocol (IP) multicast technology implements efficient point-to-multipoint data transmission in an IP network, so that network bandwidth can be effectively saved, and network load can be reduced. Therefore, a new technology for constructing a multicast packet forwarding path is put forward in the industry, and is referred to as a bit indexed explicit replication (BIER) technology. This technology proposes a new multicast technology architecture that does not need to construct a multicast distribution tree. In a BIER packet, a virtual private network (VPN) to which a source node of an inner data packet of the BIER packet belongs and information about an ingress node of a BIER domain need to be identified simultaneously, so that the BIER packet can support a plurality of multicast deployment and application manners, for example, support penultimate hop popping of a BIER header in the BIER packet, and support a bit-forwarding router identifier (BFR ID) not configured for the ingress node that sends the BIER packet in the BIER domain.

In a related technical solution, the BIER packet further includes an IP header, and a virtual extensible local area network (VXLAN)/network virtualization generic routing encapsulation (NVGRE)/generic network virtualization encapsulation (GENEVE) header. The IP header and the VXLAN/NVGRE/GENEVE header are for identifying the VPN to which the source node of the inner data packet of the BIER packet belongs, and are further for identifying information about the ingress node that sends the BIER packet in the BIER domain. In this technical solution, although the VPN to which the source node of the inner data packet of the BIER packet belongs and the information about the ingress node in the BIER domain may be identified simultaneously, header encapsulation overheads of the BIER packet through this encapsulation are large.

SUMMARY

This application provides a BIER packet forwarding method, a device, and a system, so that a VPN to which a source node of an inner data packet belongs and information about an ingress node that sends a BIER packet in a BIER domain can be identified in the BIER packet, and header encapsulation overheads of the BIER packet can be further reduced.

According to a first aspect, a BIER packet forwarding method is provided, including: A first network device receives a BIER packet sent by a second network device. The BIER packet includes a data packet and a global virtual private network VPN identifier, the global VPN identifier is for uniquely identifying, in a BIER domain, a VPN to which a source device of the data packet belongs, the global VPN identifier includes an identifier of the second network device and a first identifier, the identifier of the second network device is for identifying the second network device in the BIER domain, the first identifier is for identifying, on the second network device, the VPN to which the source device of the data packet belongs, the second network device is an ingress node of the BIER domain, and the first network device is an egress node of the BIER domain. The first network device determines, based on the global VPN identifier, a first VPN corresponding to the global VPN identifier. The first VPN is a VPN that is determined by the first network device and to which a destination device of the data packet belongs. The first network device sends the data packet to the destination device of the data packet corresponding to the first VPN.

In the foregoing technical solution, the BIER packet sent by the second network device to the first network device may include the global VPN identifier. The global VPN identifier includes the identifier of the second network device and identifies, on the second network device, the VPN to which the source device of the data packet belongs. The foregoing BIER packet may simultaneously identify, by using only the global VPN identifier, both a VPN to which a source node of an inner data packet of the BIER packet belongs and information about the ingress node of the BIER domain. Therefore, when the VPN to which the source node of the inner data packet belongs and the information about the ingress node that sends the BIER packet in the BIER domain are identified in the BIER packet, header encapsulation overheads of the BIER packet may be further reduced.

With reference to the first aspect, in some implementations of the first aspect, the identifier of the second network device includes any one of the following: an internet protocol version 4 IPv4 address of the second network device, an internet protocol version 6 IPv6 address of the second network device, a prefix of the IPv6 address of the second network device, and a media access control MAC address of the second network device.

With reference to the first aspect, in some implementations of the first aspect, the method further includes: The first network device receives a control packet. The control packet includes the global VPN identifier and a second route target attribute. The first network device determines a first route target attribute based on the control packet. The first route target attribute corresponds to the second route target attribute. The first network device determines a correspondence between the global VPN identifier and the first VPN based on a correspondence between the first route target attribute and the first VPN on the first network device.

With reference to the first aspect, in some implementations of the first aspect, the method further includes: The first network device determines, based on a protocol proto field in a BIER header of the BIER packet, that the BIER packet includes the global VPN identifier.

With reference to the first aspect, in some implementations of the first aspect, the global VPN identifier is located after the BIER header.

With reference to the first aspect, in some implementations of the first aspect, the first network device decapsulates the BIER packet to obtain the data packet; and the first network device sends the data packet to the destination device of the data packet corresponding to the first VPN.

According to a second aspect, a BIER packet forwarding method is provided, including: A second network device determines a correspondence between a global VPN identifier and a second route target attribute. The global VPN identifier is for uniquely identifying, in a BIER domain, a VPN to which a source device of a data packet belongs, the global VPN identifier includes an identifier of the second network device and a first identifier, the identifier of the second network device is for identifying the second network device in the BIER domain, the first identifier is for identifying, on the second network device, the VPN to which the source device of the data packet belongs, and the second network device is an ingress node of the BIER domain. The second network device sends a control packet to a first network device. The control packet includes the global VPN identifier and the second route target attribute, and the first network device is an egress node of the BIER domain. The second network device obtains the data packet. The VPN to which the source device of the data packet belongs corresponds to the second route target attribute. The second network device obtains a BIER packet based on the correspondence. The BIER packet includes the data packet and the global VPN identifier. The second network device sends the BIER packet to the first network device.

With reference to the second aspect, in some implementations of the second aspect, the identifier of the second network device includes any one of the following: an internet protocol version 4 IPv4 address of the second network device, an internet protocol version 6 IPv6 address of the second network device, a prefix of the IPv6 address of the second network device, and a media access control MAC address of the second network device.

With reference to the second aspect, in some implementations of the second aspect, a protocol proto field in a BIER header of the BIER packet indicates that the BIER packet includes the global VPN identifier.

With reference to the second aspect, in some implementations of the second aspect, the global VPN identifier is located after the BIER header of the BIER packet.

According to a third aspect, a first network device is provided, including a receiving module, a processing module, and a sending module.

The receiving module is configured to receive a BIER packet sent by a second network device. The BIER packet includes a data packet and a global virtual private network VPN identifier, the global VPN identifier is for uniquely identifying, in a BIER domain, a VPN to which a source device of the data packet belongs, the global VPN identifier includes an identifier of the second network device and a first identifier, the identifier of the second network device is for identifying the second network device in the BIER domain, the first identifier is for identifying, on the second network device, the VPN to which the source device of the data packet belongs, the second network device is an ingress node of the BIER domain, and the first network device is an egress node of the BIER domain.

The processing module is configured to determine, based on the global VPN identifier, a first VPN corresponding to the global VPN identifier. The first VPN is a VPN that is determined by the first network device and to which a destination device of the data packet belongs.

The sending module is configured to send the data packet to the destination device of the data packet corresponding to the first VPN.

With reference to the third aspect, in some implementations of the third aspect, the identifier of the second network device includes any one of the following: an internet protocol version 4 IPv4 address of the second network device, an internet protocol version 6 IPv6 address of the second network device, a prefix of the IPv6 address of the second network device, and a media access control MAC address of the second network device.

With reference to the third aspect, in some implementations of the third aspect, the receiving module is further configured to receive a control packet. The control packet includes the global VPN identifier and a second route target attribute. The processing module is further configured to determine a first route target attribute based on the control packet. The first route target attribute corresponds to the second route target attribute. The processing module is further configured to determine a correspondence between the global VPN identifier and the first VPN based on a correspondence between the first route target attribute and the first VPN on the first network device.

With reference to the third aspect, in some implementations of the third aspect, the processing module is further configured to determine, based on a protocol proto field in a BIER header of the BIER packet, that the BIER packet includes the global VPN identifier.

With reference to the third aspect, in some implementations of the third aspect, the global VPN identifier is located after the BIER header.

With reference to the third aspect, in some implementations of the third aspect, the processing module is further configured to decapsulate the BIER packet to obtain the data packet.

According to a fourth aspect, a second network device is provided, including a processing module, a sending module, and a receiving module.

The processing module is configured to determine a correspondence between a global VPN identifier and a second route target attribute. The global VPN identifier is for uniquely identifying, in a BIER domain, a VPN to which a source device of a data packet belongs, the global VPN identifier includes an identifier of the second network device and a first identifier, the identifier of the second network device is for identifying the second network device in the BIER domain, the first identifier is for identifying, on the second network device, the VPN to which the source device of the data packet belongs, and the second network device is an ingress node of the BIER domain.

The sending module is configured to send a control packet to a first network device. The control packet includes the global VPN identifier and the second route target attribute, and the first network device is an egress node of the BIER domain.

The receiving module is configured to obtain the data packet. The VPN to which the source device of the data packet belongs corresponds to the second route target attribute.

The processing module is further configured to obtain a BIER packet based on the correspondence. The BIER packet includes the data packet and the global VPN identifier.

The sending module is further configured to send the BIER packet to the first network device.

With reference to the fourth aspect, in some implementations of the fourth aspect, the identifier of the second network device includes any one of the following: an internet protocol version 4 IPv4 address of the second network device, an internet protocol version 6 IPv6 address of the second network device, a prefix of the IPv6 address of the second network device, and a media access control MAC address of the second network device.

With reference to the fourth aspect, in some implementations of the fourth aspect, a protocol proto field in a BIER header of the BIER packet indicates that the BIER packet includes the global VPN identifier.

With reference to the fourth aspect, in some implementations of the fourth aspect, the global VPN identifier is located after the BIER header of the BIER packet.

According to a fifth aspect, a first network device is provided. The first network device has a function of implementing behavior of the first network device in the foregoing methods. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device to perform a corresponding function in the foregoing methods. The interface is configured to support the first network device in receiving a BIER packet sent by a second network device, or is configured to support sending a data packet to a destination device of the data packet corresponding to a first VPN.

The first network device may further include a memory. The memory is configured to be coupled to the processor, and store program instructions and data that are required for the first network device.

In another possible design, the first network device includes a processor, a transmitter, a receiver, a random access memory, a read-only memory, and a bus. The processor is coupled to the transmitter, the receiver, the random access memory, and the read-only memory respectively through the bus. When the first network device needs to be run, a basic input/output system built into the read-only memory or a bootloader in an embedded system in the read-only memory is used to boot a system to start, to boot the first network device to enter a normal running state. After entering the normal running state, the first network device runs an application program and an operating system in the random access memory, so that the processor performs the method in the first aspect or any one of the possible implementations of the first aspect.

According to a sixth aspect, a first network device is provided. The first network device includes a main control board and an interface board, and may further include a switching board. The first network device is configured to perform the method in the first aspect or any one of the possible implementations of the first aspect. Specifically, the first network device includes a module configured to perform the method in the first aspect or any one of the possible implementations of the first aspect.

According to a seventh aspect, a first network device is provided. The first network device includes a control module and a first forwarding subdevice. The first forwarding subdevice includes an interface board, and may further include a switching board. The first forwarding subdevice is configured to perform a function of the interface board in the sixth aspect, and may further perform a function of the switching board in the sixth aspect. The control module includes a receiver, a processor, a transmitter, a random access memory, a read-only memory, and a bus. The processor is coupled to the receiver, the transmitter, the random access memory, and the read-only memory respectively through the bus. When the control module needs to be run, a basic input/output system built into the read-only memory or bootloader in an embedded system in the read-only memory is used to boot a system to start, to boot the control module to enter a normal running state. After entering the normal running state, the control module runs an application program and an operating system in the random access memory, so that the processor performs a function of the main control board in the sixth aspect.

It may be understood that the first network device may include any quantity of interfaces, processors, or memories in actual application.

According to an eighth aspect, a second network device is provided. The second network device has a function of implementing behavior of the second network device in the foregoing methods. The function may be implemented based on hardware, or may be implemented based on hardware executing corresponding software. The hardware or the software includes one or more modules corresponding to the foregoing function.

In a possible design, a structure of the second network device includes a processor and an interface. The processor is configured to support the second network device to perform a corresponding function in the foregoing methods. The interface is configured to support the second network device in obtaining a data packet, or is configured to support the second network device in sending a BIER packet to a first network device, or is configured to support the second network device in sending a control packet to the first network device.

The second network device may further include a memory. The memory is configured to be coupled to the processor, and store program instructions and data that are required for the second network device.

In another possible design, the second network device includes a processor, a transmitter, a receiver, a random access memory, a read-only memory, and a bus. The processor is coupled to the transmitter, the receiver, the random access memory, and the read-only memory respectively through the bus. When the second network device needs to be run, a basic input/output system built into the read-only memory or a bootloader in an embedded system in the read-only memory is used to boot a system to start, to boot the second network device to enter a normal running state. After entering the normal running state, the second network device runs an application program and an operating system in the random access memory, so that the processor performs the method in the second aspect or any one of the possible implementations of the second aspect.

According to a ninth aspect, a second network device is provided. The second network device includes a main control board and an interface board, and may further include a switching board. The second network device is configured to perform the method in the second aspect or any one of the possible implementations of the second aspect. Specifically, the second network device includes a module configured to perform the method in the second aspect or any one of the possible implementations of the second aspect.

According to a tenth aspect, a second network device is provided. The second network device includes a control module and a first forwarding subdevice. The first forwarding subdevice includes an interface board, and may further include a switching board. The first forwarding subdevice is configured to perform a function of the interface board in the ninth aspect, and may further perform a function of the switching board in the ninth aspect. The control module includes a receiver, a processor, a transmitter, a random access memory, a read-only memory, and a bus. The processor is coupled to the receiver, the transmitter, the random access memory, and the read-only memory respectively through the bus. When the control module needs to be run, a basic input/output system built into the read-only memory or bootloader in an embedded system in the read-only memory is used to boot a system to start, to boot the control module to enter a normal running state. After entering the normal running state, the control module runs an application program and an operating system in the random access memory, so that the processor performs a function of the main control board in the ninth aspect.

It may be understood that the second network device may include any quantity of interfaces, processors, or memories in actual application.

According to an eleventh aspect, a computer program product is provided. The computer program product includes computer program code. When the computer program code is run on a computer, the computer is enabled to perform the method according to the first aspect or any one of the possible implementations of the first aspect.

According to a twelfth aspect, a computer program product is provided. The computer program product includes computer program code. When the computer program code is run on a computer, the computer is enabled to perform the method according to the second aspect or any one of the possible implementations of the second aspect.

According to a thirteenth aspect, a computer-readable medium is provided. The computer-readable medium stores program code. When the program code is run on a computer, the computer is enabled to perform the method according to the first aspect or any one of the possible implementations of the first aspect. This computer-readable storage medium includes but is not limited to one or more of the following: a read-only memory (read-only memory, ROM), a programmable ROM (programmable ROM, PROM), an erasable PROM (erasable PROM, EPROM), a flash memory, an electrically EPROM (electrically EPROM, EEPROM), and a hard drive (hard drive).

According to a fourteenth aspect, a computer-readable medium is provided. The computer-readable medium stores program code. When the program code is run on a computer, the computer is enabled to perform the method according to the second aspect or any one of the possible implementations of the second aspect. This computer-readable storage medium includes but is not limited to one or more of the following: a read-only memory (ROM), a programmable ROM (PROM), an erasable PROM (EPROM), a flash memory, an electrically EPROM (EEPROM), and a hard drive.

According to a fifteenth aspect, a chip is provided. The chip includes a processor and a data interface, and the processor reads, through the data interface, instructions stored in a memory, to perform the method in the first aspect or any one of the possible implementations of the first aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a sixteenth aspect, a chip is provided. The chip includes a processor and a data interface, and the processor reads, through the data interface, instructions stored in a memory, to perform the method in the second aspect or any one of the possible implementations of the second aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a seventeenth aspect, a system is provided. The system includes the foregoing first network device and second network device.

BRIEF DESCRIPTION OF THE DRAWINGS

FIG. 5 is a schematic flowchart of a BIER packet forwarding method according to an embodiment of this application;

FIG. 6 is a schematic flowchart of a method for establishing a correspondence between a global VPN identifier and a local VPN identifier by an egress node according to an embodiment of this application;

FIG. 7 is a schematic flowchart of another BIER packet forwarding method according to an embodiment of this application;

FIG. 8 is a schematic diagram of a structure of a first network device 800 according to an embodiment of this application;

DETAILED DESCRIPTION OF ILLUSTRATIVE EMBODIMENTS

Figures 1, 2, 3:
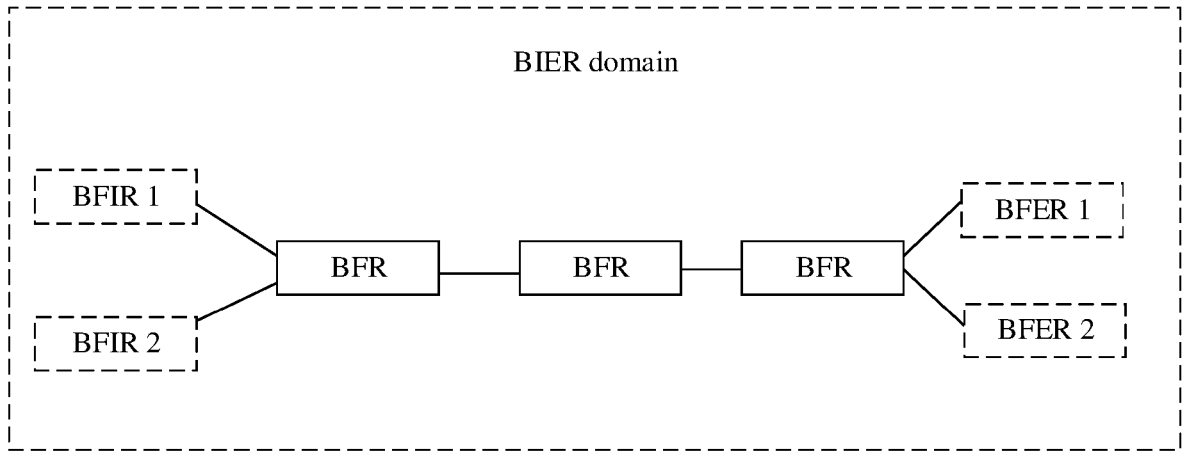
FIG. 1 is a schematic network topology diagram of a BIER domain.
FIG. 2 is a schematic diagram of a possible BIER header format.
FIG. 3 is a schematic diagram of another possible BIER header format.

The following describes technical solutions of this application with reference to the accompanying drawings.

All aspects, embodiments, or features are presented in this application based on a system that includes a plurality of devices, components, and modules. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application, "relevant" and "corresponding" may be interchangeably used sometimes. It should be noted that meanings expressed by the terms are consistent when differences are not emphasized.

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Multicast is a data transmission mode in which data is efficiently sent to a plurality of receivers in a transmission control protocol (TCP)/internet protocol (IP) network at a same time by using one multicast address. A multicast source sends multicast traffic to multicast group members in a multicast group through links in a network, and each multicast group member in the multicast group can receive the multicast traffic. In a multicast transmission mode, a point-to-multipoint data connection is implemented between the multicast source and the multicast group members. The multicast traffic needs to be transmitted only once on each network link, and multicast replication is performed only when there is a branch on the link. Therefore, in the multicast transmission mode, data transmission efficiency is improved and a possibility of congestion on a backbone network is reduced.

An internet protocol (IP) multicast technology implements efficient point-to-multipoint data transmission in the IP network, so that network bandwidth can be efficiently saved, and network load can be reduced. Therefore, the IP multicast technology is widely used in various aspects such as real-time data transmission, a multimedia conference, data copy, an internet protocol television (IPTV), a game, and simulation. In the multicast technology, a multicast tree is constructed on a control plane by using a multicast protocol, and then use the multicast tree of a logic tree-shaped, to implement multicast point-to-multipoint data forwarding. Each intermediate device using construction of a distribution tree as a core needs to maintain complex multicast forwarding information status. As a network scale expands and a traffic volume of a multicast packet increases, this multicast technology faces increasingly high costs and operation and maintenance challenges.

Therefore, a new technology for constructing a multicast packet forwarding path is put forward in the industry, and is referred to as a bit index explicit replication (BIER) technology. This technology proposes a multicast technology architecture that does not need to construct a multicast distribution tree. As shown in FIG. 1, a router that supports the BIER technology is referred to as a bit-forwarding router (BFR). A BFR that performs BIER encapsulation on a data packet is referred to as a bit forwarding ingress router (bit forwarding ingress router, BFIR). A BFR that decapsulates the data packet from a BIER packet is referred to as a bit forwarding egress router (BFER). A network domain that includes the foregoing BFIR and one or more BFERs and transmits the BIER packet is referred to as a BIER domain. Optionally, the BIER domain may further include one or more BFRs. The BFIR is located at an ingress of the BIER domain and is responsible for encapsulating the BIER packet as a head node for BIER packet forwarding. The BFR is located in the middle of the BIER domain and is responsible for forwarding the BIER packet as an intermediate forwarding node of the BIER packet. The BFER is located at an egress of the BIER domain and is responsible for decapsulating the BIER packet as a tail node for the BIER packet forwarding. It should be understood that the BFIR and the BFER in the BIER domain may also be referred to as edge BFRs in the BIER domain.

Figure 4:
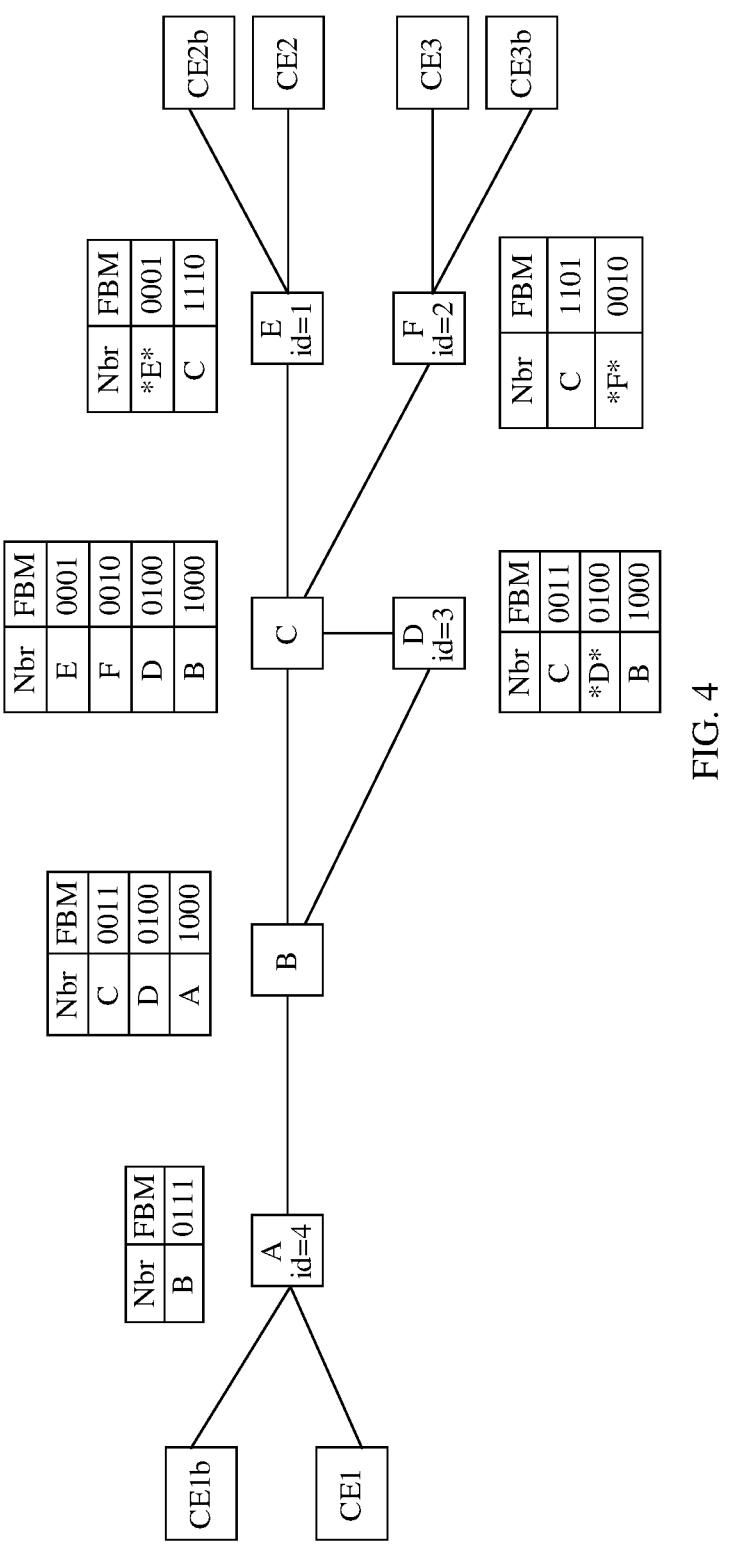
FIG. 4 is a process of establishing a BIER forwarding table based on a BIER technology and forwarding a BIER packet based on the BIER technology.

For ease of understanding, the following first describes in detail a BIER-related technology with reference to FIG. 2 to FIG. 4.

The foregoing BIER packet may include a BIER header and a data packet. The data packet may be an internet protocol version 6 (IPv6) multicast packet, or may be an internet protocol version 4 (IPv4) multicast packet, or may be an ethernet packet. This is not specifically limited in this application. All destination devices of the data packet are marked by using bit strings in the BIER header. It should be understood that, in the BIER domain, a globally unique bit position identifier may be configured for the foregoing edge BFR in an entire BIER sub-domain (SD). As an example, a value is configured for each edge BFR as a BFR identifier (BFR ID), and all BFR IDs in the BIER domain form a bit string. The BFR in the BIER domain may perform forwarding based on a bit index forwarding table (BIFT) and the bit string carried in the BIER header.

A format of the BIER header is not specifically limited in embodiments of this application, provided that the BIER header includes a bit string field. Two possible BIER header formats are respectively described below in detail with reference to FIG. 2 and FIG. 3.

FIG. 2 is a schematic block diagram of a possible BIER header format. As shown in FIG. 2, the BIER header may include but is not limited to: a bit index forwarding table identifier (BIFT ID) with a length of 20 bits, a bit string length (BSL), and another field with a length of 64 bits (8 bytes), for example, a traffic class (TC) of an original multicast packet following the BIER header, a stack (S), a time to live (TTL) field, an entropy field, a version (Ver) field, a nibble field, a protocol (proto) field, an operation administration, and maintenance (OAM) field, a reserve (Rsv) field, and a differentiated services code point (DSCP) field.

(1) BIFT ID Field

The BIFT ID field may be a BIFT-id, and may include a combination of a sub-domain (SD)/a bit string length (BSL)/a set identifier (SI). Different BIFT IDs may correspond to different combinations of SDs/BSLs/SIs. It should be understood that different BIFT IDs may be mapped to different combinations of SDs/BSLs/SIs. A BIER domain may be divided into and configured as different sub-domains SDs based on a requirement of an actual service scenario, to support features such as an interior gateway protocol (IGP) multi-topology. The BSL is a length of a bit string included in the BIER header. The SI may be understood as a set including a plurality of edge BFRs in a network or including configured BFR IDs.

The BIER header shown in FIG. 2 does not directly include a SD/BSL/SI field. The SD/BSL/SI are three implicit fields, and values of the SD/BSL/SI need to be mapped based on the BIFT ID field.

(2) Bit String Field

Each bit in a bit string is for identifying an edge BFR, for example, a least significant bit (rightmost) in the bit string is for identifying a BFER whose BFR-ID is equal to 1. A second bit from the right to the left in the bit string is for identifying a BFER whose BFR-ID is equal to 2. For a forwarding entry based on which a forwarding plane performs forwarding, several specific BFERs to which a packet is to be sent are determined based on a bit string in the packet. When the BFR in the BIER domain receives a packet that includes a BIER header, the BFR forwards the BIER packet based on a bit string and a BIFT ID that are carried in the BIER header. It should be noted that a value 1 of the bit indicates that the packet needs to be sent to a BFER device represented by the BFR-ID, and a value 0 of the bit indicates that the packet does not need to be sent to the BFER device represented by the BFR-ID.

(3) Protocol (Proto) Field

The protocol field is for identifying a format of a payload following a BIER header. For example, a value of the proto field being 4 represents that a data packet following the BIER header is an IPv4 packet. For another example, the value of the proto field being 6 represents that the data packet following the BIER header is an IPv6 packet.

FIG. 3 is a schematic block diagram of another possible BIER header format. Compared with the BIER header format shown in FIG. 2, the BIER header format shown in FIG. 3 does not include the BIFT-ID field, but includes three fields: the SD field, the BSL field, and the SI field. In other words, the BIER header format shown in FIG. 3 directly includes the three fields: the SD field, the BSL field, and the SI field, and an SD/BSL/SI value does not need to be obtained through mapping from the BIFT ID field.

The following uses a BIER domain shown in FIG. 4 as an example to describe in detail a process of establishing a BIER forwarding table based on the BIER technology and forwarding a BIER packet.

As shown in FIG. 4, a CE1, a CE1b, a CE2, a CE2b, a CE3 and a CE3b belong to customer edge (CE) devices, and may be routers or hosts on a CE side. As an example, the CE1, the CE2, and the CE3 may belong to a VPN. For a data packet, the CE1 may be used as an ingress node of the data packet, and the CE2 and the CE3 may be used as egress nodes of the data packet. As another example, the CE1b, the CE2 b, and the CE3b may belong to a VPN. For a data packet, the CE1b may be used as an ingress node of the data packet, and the CE2b and the CE3b may be used as egress nodes of the data packet.

Refer to FIG. 4. A network including a device A to a device F belongs to a bearer network. The bearer network may be, for example, an operator network, a data center network, or a campus network. This is not specifically limited in this application. The device A, a device D, a device E, and the device F belong to service provider edge (PE) devices. For the bearer network or forwarding of the BIER packet, the device A may be an ingress PE device of the BIER domain, is responsible for performing BIER encapsulation on the data packet to obtain the BIER packet, and corresponds to the BFIR in FIG. 1. The device D, the device E, and the device F are egress PE devices of the BIER domain, are responsible for decapsulating the BIER packet to obtain an original multicast packet, and correspond to the BFERs in FIG. 1. The device B and the device C are intermediate forwarding devices of the BIER domain and correspond to the BFRs in FIG. 1.

In embodiments of this application, a unique BFR-ID may be allocated to an edge BFR in each BIER domain. For example, in FIG. 4, BFR-IDs configured for the device A, the device E, the device D, and the device F are respectively 4, 1, 3, and 2. No BFR-ID is allocated to the intermediate forwarding BFRs, for example, the device B and the device C. It should be noted that in embodiments of this application, "ID" and "id" sometimes may be interchanged. It should be noted that when a difference is not emphasized, meanings to be expressed by the terms are the same. The BFR-ID in this application may refer to an id in FIG. 4.

After receiving the data packet, the device A may encapsulate a BIER header into the data packet to form the BIER packet. Bit string fields in the BIER header mark all destination devices of the BIER packet. For example, a bit string corresponding to the device E whose BFR-ID is 1 is 0001, a bit string corresponding to the device F whose BFR-ID is 2 is 0010, a bit string corresponding to the device D whose BFR-ID is 3 is 0100, and a bit string corresponding to the device A whose BFR-ID is 4 is 1000.

It should be understood that a BFR-ID value allocated to an edge BFR in each BIER domain may be flooded to another BFR in the BIER domain by using a route protocol, so that devices in the BIER domain may establish a BIFT based on flooded BIER information. The BIFT is for instructing the devices in the BIER domain to forward the BIER packet.

By using the device A as an example, if the BIER packet needs to be sent to BFERs whose BFR-IDs are 1, 2, and 3 respectively, the BIER packet needs to be first sent to a neighbor (the device B) of the device A, and an edge BFR whose BFR-ID is 4 is the device A itself. Therefore, a BIFT established by the device A is: neighbor (neighbor, Nbr)=B, and forwarding bit mask (FBM)=0111. The BIFT indicates that when any one of a first bit, a second bit, and a third bit from right to left in a bit string of a BIER packet is 1, the BIER packet is sent to the neighbor (the device B) of the device A. Nbr=B indicates that the neighbor of the device A is the device B. It is assumed that receivers of the data packet obtained by the device A are respectively a destination device D whose BFR-ID is 3, a destination device F whose BFR-ID is 2, and a destination device E whose BFR-ID is 1. The bit string of the BIER header encapsulated by the device A is 0111, and the BIER packet is forwarded to the neighbor device B based on the BIFT established by the device A.

After receiving the BIER packet, the device B determines, based on the bit string 0111 and a BIFT established by the device B in FIG. 4, that the BIER packet needs to be sent to the device C and the device D respectively. For example, when sending the BIER packet to the device C, the device B may perform an AND operation on the bit string (0111) in the BIER header and an FBM field corresponding to Nbr=C in the BIFT entry. In this embodiment of this application, a result of the AND operation is 0011. Therefore, the device B may change the bit string of the BIER header to 0011, and send the BIER packet to the device C. For another example, when sending the BIER packet to the device D, the device B may change the bit string of the BIER header to 0100, and send the BIER packet to the device D.

Similarly, the device C may determine, based on the bit string of the BIER packet and a BIFT established by the device C in FIG. 4, that the BIER packet needs to be sent to the device E and the device F respectively. A bit string of the BIER packet sent from the device C to the device E is 0001, and a bit string of the BIER packet sent from the device C to the device F is 0010.

For the device E, Nbr=*E* in a BIFT established by the device E indicates that a neighbor device of the device E is the device E itself. The device E may determine, based on the identifier * in the BIFT, that the neighbor of the device E is the device E itself. As a BFER at an egress of the BIER domain, the device E may decapsulate the BIER packet to obtain the data packet, and forward the data packet to a CE based on information (for example, a destination address in the data packet) in an inner data packet. A forwarding process of the device F is similar to a forwarding process of the device E. For details, refer to the forwarding process of the device E, and the details are not described herein again.

For a BFER at the egress of the BIER domain, for example, the device E, after receiving the BIER packet, a virtual private network (VPN) instance to which the data packet belongs needs to be determined, a virtual routing forwarding (VRF) table corresponding to the VPN instance is determined based on the VPN instance, and the data packet is forwarded to a next hop (for example, the CE2 or the CE2b) in the VRF table based on the information (for example, the destination address in the data packet) in the data packet and the VRF table. Therefore, as a BFIR of the BIER domain, the device A needs to identify VPN information corresponding to the data packet and information about a source node (for example, the device A) when encapsulating the BIER packet.

In a related technical solution, the BIER packet further includes an IP header, a virtual extensible local area network (VXLAN)/network virtualization generic routing encapsulation (NVGRE)/generic network virtualization encapsulation (GENEVE) header. The IP header and the VXLAN/ NVGRE/GENEVE header are for identifying the VPN to which the source node of the inner data packet of the BIER packet belongs, and are further for identifying information about the ingress node that sends the BIER packet in the BIER domain. In this technical solution, although the VPN to which the source node of the inner data packet of the BIER packet belongs and the information about the ingress node in the BIER domain may be identified simultaneously, header encapsulation overheads of the BIER packet through this encapsulation are large.

In view of this, an embodiment of this application provides a BIER packet forwarding method, so that a VPN to which a source node of an inner data packet belongs and information about an ingress node that sends the BIER packet in the BIER domain can be identified in the BIER packet, and header encapsulation overheads of the BIER packet can be further reduced.

FIG. 5 is a schematic flowchart of a BIER packet forwarding method according to an embodiment of this application. Refer to FIG. 5. The method may include steps 510 to 530. The following describes steps 510 to 530 in detail.

Step 510: A first network device receives a BIER packet sent by a second network device, where the BIER packet includes a data packet and a global virtual private network VPN identifier.

The first network device may be an egress node of the BIER domain, and correspond to the device A in FIG. 4. The second network device may be an ingress node of the BIER domain, and correspond to the device E in FIG. 4.

The data packet included in the foregoing BIER packet may be a multicast packet, or may be a broadcast, unknown unicast, multicast (BUM) packet. This is not specifically limited in this application.

The global virtual private network VPN identifier included in the BIER packet may be for uniquely identifying, in the BIER domain, a VPN to which a source device of the data packet belongs. The global VPN identifier may include an identifier of the second network device and a first identifier, where the identifier of the second network device is for identifying the second network device in the BIER domain, and the identifier of the second network device may include but is not limited to any one of the following: an internet protocol version 4 IPv4 address of the second network device, an internet protocol version 6 IPv6 address of the second network device, a prefix of the IPv6 address of the second network device, and a media access control (MAC) address of the second network device. The first identifier is for identifying, on the second network device, the VPN to which the source device of the data packet belongs. In other words, the first identifier is locally configured on the second network device, and is for identifying, on the second network device, the VPN to which the source device of the data packet belongs. It should be understood that the source device of the data packet may be a CE device that communicates with the second network device. For example, the second network device is the device A in FIG. 4. The source device of the data packet may be the CE1 or the CE1b that communicates with the device A.

Step 520: The first network device determines, based on the global VPN identifier, a first VPN corresponding to the global VPN identifier.

After receiving the BIER packet, the first network device may determine, based on the global VPN identifier included in the BIER packet and a correspondence between the global VPN identifier and the first VPN, the first VPN corresponding to the global VPN identifier. The first VPN may be locally configured by the first network device, for identifying, on the first network device, a VPN to which a destination device of the data packet belongs. It should be understood that the destination device of the data packet may be a CE device that communicates with the first network device. For example, the first network device is the device E in FIG. 4. The destination device of the data packet may be the CE2 or the CE2b that communicates with the device E.

Optionally, before Step 520, the first network device may further determine the correspondence between the global VPN identifier and the first VPN. As an example, the first network device may receive a control packet sent by the second network device, where the control packet includes the global VPN identifier and a second route target attribute. The first network device may determine, based on the second route target attribute, a first route target attribute corresponding to the second route target attribute, and determine the correspondence between the global VPN identifier and the first VPN based on a correspondence that is between the first route target attribute and the first VPN and that is locally configured on the first network device.

It should be understood that, in the foregoing first route target attribute and the second route target attribute, a route target (RT) attribute may be for controlling route distribution between VPN sites, and the RT attribute may also be an RT community extended attribute. Specifically, as an example, the RT attribute may be carried in a BGP route (which may also be referred to as a BGP message) sent by the second network device to the first network device. After receiving the BGP route, the first network device may install the BGP route into a VRF based on the RT attribute carried in the BGP route. The RT attribute may also be understood as being for identifying a group of VRFs. For example, a same RT attribute is allowed to be configured for a plurality of VRFs, and the second network device may correspondingly install the received BGP route in the plurality of VRFs. For another example, one RT attribute is configured for one VRF, and different RT attributes are configured for different VRFs. When receiving one BGP route, the second network device installs the BGP route into only one VRF.

Step 530: The first network device sends the data packet to the destination device of the data packet corresponding to the first VPN.

After determining the first VPN corresponding to the global VPN identifier, the first network device may decapsulate the BIER packet to obtain the data packet, and send the data packet to the destination device of the data packet corresponding to the first VPN. For example, the first network device is the device E in FIG. 4, and the destination device of the data packet corresponding to the first VPN is the CE2. The first network device may send the data packet to the CE2 through an interface connected to the CE2.

In the foregoing technical solution, the BIER packet sent by the second network device to the first network device may include the global VPN identifier. The global VPN identifier includes the identifier of the second network device and identifies, on the second network device, the VPN to which the source device of the data packet belongs. The foregoing BIER packet may simultaneously identify, by using only the global VPN identifier, both a VPN to which a source node of an inner data packet of the BIER packet belongs and information about the ingress node of the BIER domain. Therefore, when the VPN to which the source node of the inner data packet belongs and the information about the ingress node that sends the BIER packet in the BIER domain are identified in the BIER packet, header encapsulation overheads of the BIER packet may be further reduced.

The BIER domain shown in FIG. 4 is used below as an example. With reference to FIG. 6, a specific implementation of establishing, by an egress node, a correspondence between a global VPN identifier and a local VPN identifier according to an embodiment of this application is described in detail. It should be understood that the example in FIG. 6 is merely intended to help a person skilled in the art understand this embodiment of this application, instead of limiting this embodiment of this application to a specific value or a specific scenario of the example. Apparently, a person skilled in the art can make various equivalent modifications or changes according to the examples provided below in FIG. 6, and such modifications and changes also fall within the scope of the embodiments of this application.

FIG. 6 is a schematic flowchart of a method for establishing a correspondence between a global VPN identifier and a local VPN identifier by an egress node according to an embodiment of this application. Refer to FIG. 6. The method may include steps 610 to 630. The following describes steps 610 to 630 in detail.

Step 610: An ingress device (for example, a device A) of a BIER domain configures different global VPN identifiers for different VPNs.

As the ingress device of the BIER domain, the device A may allocate different global VPN identifiers to different VPNs. One global VPN identifier may be for uniquely identifying, in the BIER domain, one VPN to which a source device (for example, a CE communicating with the device A) of a data packet belongs. In other words, global VPN identifiers that correspond to different VPNs are different. As an example, the foregoing global VPN identifier may be a value not less than 6 bytes (that is, not less than 48 bits) and not greater than 20 bytes (that is, not greater than 160 bits).

The foregoing global VPN identifier may include an identifier of the device A and an ID value locally configured by the device A for identifying the VPN to which the source device of the data packet belongs. There are a plurality of specific implementations of the global VPN identifier. This is not specifically limited in this embodiment of this application. For example, a value including an IPv4 address and an ID may be used as the global VPN identifier, where the IPv4 address is an IPv4 address on the ingress device (for example, the device A) of the BIER domain, the ID is a value configured on the ingress device (for example, the device A) of the BIER domain for identifying the VPN to which the source device of the data packet belongs, and different VPNs correspond to different IDs. For another example, a value including an IPv6 address (or a part of the IPv6 address) and an ID may also be used as the global VPN identifier, where the IPv6 address or the part of the IPv6 address belongs to the ingress device (for example, the device A) of the BIER domain and can uniquely identify the ingress device (for example, the device A) of the BIER domain in a bearer network. For another example, a value including a media access control (MAC) address and an ID may also be used as the global VPN identifier, where the MAC address uniquely identifies the ingress device (for example, the device A) of the BIER domain. The following describes in detail specific implementation processes of the foregoing several different manners respectively with reference to specific examples.

In a possible implementation, the global VPN identifier includes an IPv4 address and a VPN-related ID on the ingress device (for example, the device A) of the BIER domain. For example, an IPv4 address on the device A is 1.1.1.10, and the address 1.1.1.10 may uniquely identify the device A in the bearer network. Configuration on the device A is as follows.

```
Ip vpn vpn1
    Mvpn
        Global-vpn-id 1.1.1.10:1234
Ip vpn vpn2
    Mvpn
        Global-vpn-id 1.1.1.10:1235
```

"Global-vpn-id 1.1.1.10:1234" represents that a global VPN identifier corresponding to a VPN1 is 1.1.1.10:1234, and the global VPN identifier includes "1.1.1.10" and ":1234", where "1.1.1.10" represents an IPv4 address on the device A, and ":1234" represents an ID that is on the device A and that corresponds to the VPN1.

"Global-vpn-id 1.1.1.10:1235" represents that a global VPN identifier corresponding to a VPN2 is 1.1.1.10:1235, and the global VPN identifier includes "1.1.1.10" and ":1235", where "1.1.1.10" represents an IPv4 address on the device A, and ":1235" represents an ID that is on the device A and that corresponds to the VPN2.

There may be a plurality of lengths of the global VPN identifier in the foregoing configuration. This is not specifically limited in this application. As an example, a length of the global VPN identifier may be a length of 96 bits. For example, in this example, when the global VPN identifier is configured as <1.1.1.10:1234>, the global VPN identifier may include: 32-bit IPv4 address <1.1.1.10>+32-bit padding <all 0>+32-bit ID value <1234>. For another example, in this example, when the global VPN identifier is configured as <1.1.1.10:1234>, the global VPN identifier may alternatively include: 32-bit IPv4 address <1.1.1.10>+32-bit ID value <1234>+32-bit padding <all 0>. As another example, a length of the global VPN identifier may alternatively be a length of 80 bits. For example, in this example, when the global VPN identifier is configured as <1.1.1.10:1234>, the global VPN identifier may include: 32-bit IPv4 address <1.1.1.10>+16-bit ID value <1234>+16-bit padding <all 0>. For another example, in this example, when the global VPN identifier is configured as <1.1.1.10:1234>, the global VPN identifier may alternatively include: 32-bit IPv4 address <1.1.1.10>+16-bit padding <all 0>+16-bit ID value <1234>.

In another possible implementation, the global VPN identifier includes an IPv6 address (or a part of the IPv6 address) and a VPN-related ID on the ingress device (for example, the device A) of the BIER domain. For example, a prefix of the IPv6 address on the device A is 2001:db8:a:a. That is, all IPv6 addresses starting with 2001:db8:a:a belong to the device A. Configuration on the device A is as follows.

```
SRv6 locator loc1 2001:db8:a:a :: 64 static 64
Ip vpn vpn1
   Mvpn
      Global-vpn-id loc1 ::1234
Ip vpn vpn2
   Mvpn
      Global-vpn-id loc1 ::1235
```

"SRv6 locator loc1 2001:db8:a:a:: 64 static 64" represents that an address block loc1 is defined on the device A as 2001:db8:a:a, and a mask is 64 bits. That is, a prefix of the IPv6 address on the device A is 2001:db8:a:a.

"Global-vpn-id loc1::1234" represents that a global VPN identifier corresponding to a VPN1 includes "loc1" and "::1234", "loc1" represents an address block 2001:db8:a:a defined on the device A, and "::1234" represents an ID corresponding to the VPN1 on the device A. That is, the global VPN identifier corresponding to the VPN1 is 2001:db8:a:a::1234.

"Global-vpn-id loc1::1235" represents that a global VPN identifier corresponding to a VPN2 includes "loc1" and "::1235", "loc1" represents an address block 2001:db8:a:a defined on the device A, and "::1235" represents an ID corresponding to the VPN2 on the device A. That is, the global VPN identifier corresponding to the VPN2 is 2001:db8:a:a::1235.

There may be a plurality of lengths of the global VPN identifier in the foregoing configuration. This is not specifically limited in this application. As an example, a length of the global VPN identifier may be a length of 128 bits. For example, in this example, when the global VPN identifier is configured as <2001:db8:a:a::1234>, the global VPN identifier may include: 64-bit prefix of the IPv6 address <2001:db8:a:a>+64-bit ID value <::1234>. For another example, in this example, when the global VPN identifier is configured as <2001:db8:a:a::1234>, the global VPN identifier may alternatively include: 64-bit prefix of the IPv6 address <2001:db8:a:a>+32-bit ID value <::1234>+32-bit padding <all 0>. As another example, a length of the global VPN identifier may alternatively be a length of 96 bits. For example, in this example, when the global VPN identifier is configured as <2001:db8:a:a::1234>, the global VPN identifier may include: 64-bit prefix of the IPv6 address <2001:db8:a:a>+32-bit ID value <::1234>.

In another possible implementation, the global VPN identifier includes a MAC address and a VPN-related ID on the ingress device (for example, the device A) of the BIER domain. For example, a MAC address of the device A is 98-76-54-33-22-11, and the MAC address 98-76-54-33-22-11 may uniquely identify the device A in the bearer network. Configuration on the device A is as follows.

```
Ip vpn vpn1
   Mvpn
      Global-vpn-id 98-76-54-33-22-11:1234
Ip vpn vpn2
   Mvpn
      Global-vpn-id 98-76-54-33-22-11:1235
```

"Global-vpn-id 98-76-54-33-22-11:1234" represents that a global VPN identifier corresponding to a VPN1 is 98-76-54-33-22-11:1234, and the global VPN identifier includes "98-76-54-33-22-11" and ":1234". "98-76-54-33-22-11" represents a MAC address on the device A, and ":1234" represents an ID corresponding to the VPN1 on the device A.

"Global-vpn-id 98-76-54-33-22-11:1235" represents that a global VPN identifier corresponding to a VPN2 is 98-76-54-33-22-11:1235, and the global VPN identifier includes "98-76-54-33-22-11" and ":1235". "98-76-54-33-22-11" represents a MAC address on the device A, and ":1235" represents an ID corresponding to the VPN2 on the device A.

There may be a plurality of lengths of the global VPN identifier in the foregoing configuration. This is not specifically limited in this application. As an example, a length of the global VPN identifier may be a length of 64 bits. For example, in this example, when the global VPN identifier is configured as <98-76-54-33-22-11:1235>, the global VPN identifier may include: 48-bit MAC address <98-76-54-33-22-11>+16-bit ID value <1234>.

Step 620: The ingress device (for example, the device A) of the BIER domain sends a global VPN identifier and a route target attribute corresponding to the global VPN identifier to egress devices (for example, a device E and a device F) of the BIER domain.

The device A may advertise the global VPN identifier and the route target attribute corresponding to the global VPN identifier to the egress devices (for example, the device E and the device F) of the BIER domain by using a control plane message. A specific type of the foregoing control plane message is not limited in this embodiment of this application. For example, the control plane message may be a border gateway protocol (border gateway protocol, BGP)

message, for example, a BGP message (or a BGP-MVPN message for short) in a multicast virtual private network (MVPN) address family, or a BGP message (or a BGP-EVPN message for short) in an ethernet VPN instance (EVPN) address family. As an example, when the BGP-MVPN message is used, the message advertised from the ingress device (for example, the device A) of the BIER domain to the egress devices (for example, the device E and the device F) of the BIER domain may be a multicast virtual private network inclusive provider multicast service inter-face auto-discovery route (MVPN I-PMSI A-D) message or a multicast virtual private network selective provider multicast service interface auto-discovery route (MVPN S-PMSI A-D) message.

By using an example in which the device A carries the global VPN identifier and the route target attribute corresponding to the global VPN identifier by advertising an I-PMSI A-D message, the I-PMSI A-D message may include an RT extended community attribute and the global VPN identifier. The RT extended community attribute is the foregoing route target attribute, and the global VPN identifier is the foregoing Global-vpn-id configured on the device A. Similar to the I-PMSI A-D message, an S-PMSI A-D message also carries the global VPN identifier and the route target attribute corresponding to the global VPN identifier that are configured by the device A. For details, refer to the description of the I-PMSI A-D message. Details are not described herein again.

A correspondence between a VPN and a route target attribute (which may also be referred to as a VPN-target or a target) is further configured on the device A. As an example, the configuration on the device A is as follows.

---

Ip vpn vpn1
    Vpn-target 1:1
Ip vpn vpn2
    Vpn-target 2:2

---

"Ip vpn vpn1 Vpn-target 1:1" represents that a VPN-target corresponding to a VPN1 is <1:1>. "Ip vpn vpn2 Vpn-target 2:2" represents that a VPN-target corresponding to a VPN2 is <2:2>.

Step 630: The egress devices (for example, the device E and the device F) of the BIER domain establish a corre-spondence between the global VPN identifier and a local VPN identifier.

The egress devices (for example, the device E and the device F) of the BIER domain may locally configure a correspondence between a VPN-target and a local VPN identifier. As an example, configurations on the device E and the device F are as follows.

---

Device E:
Ip vpn E_vpn1
    Vpn-target 1:1
Ip vpn E_vpn2
    Vpn-target 2:2

---

"Ip vpn E_vpn1 Vpn-target 1:1" represents that a VPN-target corresponding to a local VPN identifier <E_vpn1> is <1:1>. "Ip vpn E_vpn2 Vpn-target 2:2" represents that a VPN-target corresponding to a local VPN identifier <E_vpn2> is <2:2>.

---

Device F:
Ip vpn F_vpn1
    Vpn-target 1:1
Ip vpn F_vpn2
    Vpn-target 2:2

---

"Ip vpn F_vpn1 Vpn-target 1:1" represents that a VPN-target corresponding to a local VPN identifier <F_vpn1> is <1:1>. "Ip vpn F_vpn2 Vpn-target 2:2" represents that a VPN-target corresponding to a local VPN identifier <F_vpn2> is <2:2>.

After receiving the global VPN identifier and the VPN-target that are sent by the ingress device (for example, the device A) of the BIER domain, the egress devices (for example, the device E and the device F) of the BIER domain may determine the local VPN identifier based on the VPN-target and the correspondence between the VPN-target and the local VPN identifier that is configured locally, and further the correspondence between the local VPN identifier and the global VPN identifier of the egress devices of the BIER domain is further established.

The following describes in detail a specific implementa-tion of establishing a correspondence on the device E and the device F by using an example in which a message sent by the device A to the egress devices (for example, the device E and the device F) of the BIER domain includes (Global-vpn-id<1.1.1.10:1234>) and (VPN-target<1:1>).

By using the device E as an example, after receiving the message sent by the device A, the device E may determine a local VPN identifier <E_vpn1> of the device E based on the VPN-target <1:1> in the message, and further determine a correspondence 1 between the (Global-vpn-id<1.1.1.10: 1234>) and the local VPN identifier <E_vpn1>.

By using the device F as an example, after receiving the message sent by the device A, the device F may determine a local VPN identifier <F_vpn1> of the device F based on a VPN-target <1:1> in the message, and further determine a correspondence 2 between the (Global-vpn-id<1.1.1.10: 1234>) and the local VPN identifier <F_vpn1>.

The following describes in detail a specific implementa-tion of establishing a correspondence on the device E and the device F by using an example in which a message sent by the device A to the egress devices (for example, the device E and the device F) of the BIER domain includes (Global-vpn-id<1.1.1.10:1235>) and (VPN-target<2:2>).

By using the device E as an example, after receiving the message sent by the device A, the device E may determine a local VPN identifier <E_vpn2> of the device E based on the VPN-target <2:2> in the message, and further determine a correspondence 3 between the (Global-vpn-id<1.1.1.10: 1235>) and the local VPN identifier <E_vpn2>.

By using the device F as an example, after receiving the message sent by the device A, the device F may determine a local VPN identifier <F_vpn2> of the device F based on the VPN-target <2:2> in the message, and further determine a correspondence 4 between the (Global-vpn-id<1.1.1.10: 1235>) and the local VPN identifier <F_vpn2>.

The following uses the BIER domain shown in FIG. 4 as an example. With reference to FIG. 7, a specific implemen-tation of a BIER packet forwarding method according to an embodiment of this application is described in detail. It should be understood that the example in FIG. 7 is merely intended to help a person skilled in the art understand this embodiment of this application, instead of limiting this embodiment of this application to a specific value or a specific scenario of the example. Apparently, a person skilled in the art can make various equivalent modifications or changes according to the examples provided below in FIG. 7, and such modifications and changes also fall within the scope of the embodiments of this application.

FIG. 7 is a schematic flowchart of another BIER packet forwarding method according to an embodiment of this application. Refer to FIG. 7. The method may include steps 710 to 730. The following describes steps 710 to 730 in detail. It should be understood that in FIG. 7, an example in which a device A receives a data packet sent by a CE1 is used for description.

Step 710: The device A performs BIER encapsulation on the data packet received from the CE1, to obtain a BIER packet.

The device A receives the data packet sent by the CE1, determines a VPN part corresponding to the data packet, and encapsulates the VPN part and a BIER header into the data packet, to obtain the BIER packet. In an implementation, the VPN part is a global VPN identifier, and a format of the BIER packet may be: BIER header+global VPN identifier+data packet. In an implementation, the VPN part is: global VPN identifier+proto field+reserved field, and the format of the BIER packet may be: BIER header+global VPN identifier+proto field+reserved field+data packet.

Specifically, because the CE1 belongs to a VPN1, the device A may determine that the data packet received from the CE1 belongs to the VPN1, and the device A further determines, based on the configuration in step 610, a global VPN identifier corresponding to the VPN1. For example, the global VPN identifier corresponding to the VPN1 may be <1.1.1.10:1234>, and a length of the global VPN identifier may be 96 bits, or may be 80 bits. For a specific format, refer to the description in step 610, and details are not described herein again. For another example, the global VPN identifier corresponding to the VPN1 may also be <2001:db8:a:a:: 1234>, and a length of the global VPN identifier may be 128 bits, or may be 96 bits. For a specific format, refer to the description in step 610, and details are not described herein again. For another example, the global VPN identifier corresponding to the VPN1 may also be <98-76-54-33-22-11: 1234>.

Step 720: The device A may further transmit the BIER packet to egress devices (for example, a device E and a device F) of a BIER domain through a bearer network.

A possible path is that the device A sends the data packet to a device B, the device B sends the data packet to a device C, and the device C sends the data packet to the device E and the device F. Another possible path is that the device A sends the data packet to the device B, the device B sends the data packet to the device C through a device D, and the device C sends the data packet to the device E and the device F. For a specific process of forwarding the BIER packet, refer to the description in FIG. 4. Details are not described herein again.

Step 730: The egress devices (for example, the device E and the device F) of the BIER domain process the BIER packet.

By using the device E as an example, after receiving the BIER packet, the device E may determine, based on the BIER header of the BIER packet, whether to decapsulate the BIER packet. For example, if a BFR-id of the device E is 1, and a value of a first bit from right to left in a bit string field in the BIER header is 1, the device E determines that the device E itself is a tail node of the BIER packet, and the device E may perform the following processing on the BIER packet.

1. The device E determines that the BIER packet includes the global VPN identifier.

As an example, the proto field in the BIER header of the BIER packet may indicate that the global VPN identifier is after the BIER header, and the device E may also determine, based on the proto field in the BIER header, that the BIER packet includes the global VPN identifier.

2. The device E determines a local VPN identifier on the device E based on the global VPN identifier.

The device E may read the global VPN identifier included in the BIER packet, and determine the local VPN identifier on the device E based on a correspondence between the global VPN identifier and the local VPN identifier on the device E. For example, the global VPN identifier included in the BIER packet is <1.1.1.10:1234>, and the device E may determine that the local VPN identifier is <E_vpn1> based on a correspondence 1 between (Global-vpn-id<1.1.1.10: 1234>) and the local VPN identifier <E_vpn1>. In other words, the device E may determine that an inner data packet of the BIER packet belongs to the VPN1.

3. The device E decapsulates the BIER packet to obtain the inner data packet, and sends the data packet to an interface corresponding to the VPN1.

The device E may decapsulate and remove the BIER header and the global VPN identifier at an outer layer of the BIER packet, to obtain the data packet. Because the data packet belongs to the VPN1, the device E may send the data packet to a CE2 through an interface connected to the CE2.

The device F processes the BIER packet, which is similar to that the device E processes the BIER packet. For details, refer to the process of processing the BIER packet by the device E, and details are not described herein again.

With reference to FIG. 1 to FIG. 7, the foregoing describes in detail the BIER packet forwarding methods according to embodiments of this application. The following describes in detail apparatus embodiments of this application with reference to FIG. 8 to FIG. 13. It should be understood that the descriptions of the method embodiments correspond to descriptions of the apparatus embodiments. Therefore, for parts that are not described in detail, refer to the descriptions in the foregoing method embodiments.

FIG. 8 is a schematic diagram of a structure of a first network device 800 according to an embodiment of this application. The first network device 800 shown in FIG. 8 may perform corresponding steps performed by the first network device in the methods in the foregoing embodiments. As shown in FIG. 8, the first network device 800 includes a receiving module 810, a processing module 820, and a sending module 830.

The receiving module 810 is configured to receive a BIER packet sent by a second network device, where the BIER packet includes a data packet and a global virtual private network VPN identifier, the global VPN identifier is for uniquely identifying, in a BIER domain, a VPN to which a source device of the data packet belongs, the global VPN identifier includes an identifier of the second network device and a first identifier, the identifier of the second network device is for identifying the second network device in the BIER domain, the first identifier is for identifying, on the second network device, the VPN to which the source device of the data packet belongs, the second network device is an ingress node of the BIER domain, and the first network device is an egress node of the BIER domain.

The processing module 820 is configured to determine, based on the global VPN identifier, a first VPN corresponding to the global VPN identifier, where the first VPN is a VPN that is determined by the first network device and to which a destination device of the data packet belongs.

The sending module 830 is configured to send the data packet to the destination device of the data packet corresponding to the first VPN.

Optionally, the identifier of the second network device includes any one of the following: an internet protocol version 4 IPv4 address of the second network device, an internet protocol version 6 IPv6 address of the second network device, a prefix of the IPv6 address of the second network device, and a media access control MAC address of the second network device.

Optionally, the receiving module 810 is further configured to receive a control packet, where the control packet includes the global VPN identifier and a second target. The processing module 820 is further configured to determine a first target based on the control packet, where the first target corresponds to the second target. The processing module 820 is further configured to determine a correspondence between the global VPN identifier and the first VPN based on a correspondence between the first target and the first VPN on the first network device.

Optionally, the processing module 820 is further configured to determine, based on a protocol proto field in a BIER header of the BIER packet, that the BIER packet includes the global VPN identifier.

Optionally, the global VPN identifier is located after the BIER header.

Optionally, the processing module 820 is further configured to decapsulate the BIER packet to obtain the data packet.

Figure 9:
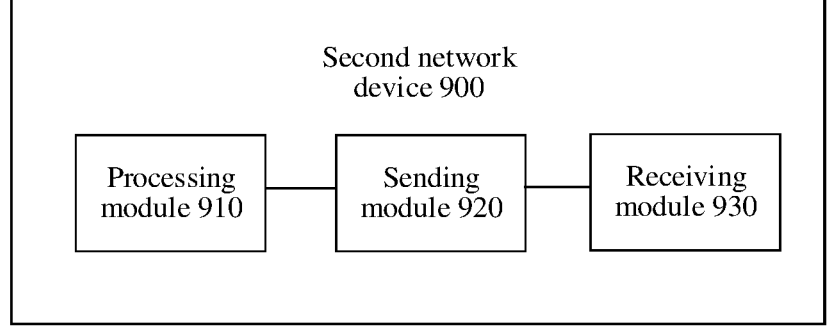
FIG. 9 is a schematic diagram of a structure of a second network device 900 according to an embodiment of this application.

FIG. 9 is a schematic diagram of a structure of a second network device 900 according to an embodiment of this application. The second network device 900 shown in FIG. 9 may perform corresponding steps performed by the second network device in the methods in the foregoing embodiments. As shown in FIG. 9, the second network device 900 includes a processing module 910, a sending module 920, and a receiving module 930.

The processing module 910 is configured to determine a correspondence between a global VPN identifier and a second target, where the global VPN identifier is for uniquely identifying, in a BIER domain, a VPN to which a source device of a data packet belongs, the global VPN identifier includes an identifier of the second network device and a first identifier, the identifier of the second network device is for identifying the second network device in the BIER domain, the first identifier is for identifying, on the second network device, the VPN to which the source device of the data packet belongs, and the second network device is an ingress node of the BIER domain.

The sending module 920 is configured to send a control packet to a first network device, where the control packet includes the global VPN identifier and the second target, and the first network device is an egress node of the BIER domain.

The receiving module 930 is configured to obtain the data packet, where the VPN to which the source device of the data packet belongs corresponds to the second target.

The processing module 910 is further configured to obtain a BIER packet based on the correspondence, where the BIER packet includes the data packet and the global VPN identifier.

The sending module 920 is further configured to send the BIER packet to the first network device.

Optionally, the identifier of the second network device includes any one of the following: an internet protocol version 4 IPv4 address of the second network device, an internet protocol version 6 IPv6 address of the second network device, a prefix of the IPv6 address of the second network device, and a media access control MAC address of the second network device.

Optionally, a protocol proto field in a BIER header of the BIER packet indicates that the BIER packet includes the global VPN identifier.

Optionally, the global VPN identifier is located after the BIER header of the BIER packet.

Figure 10:
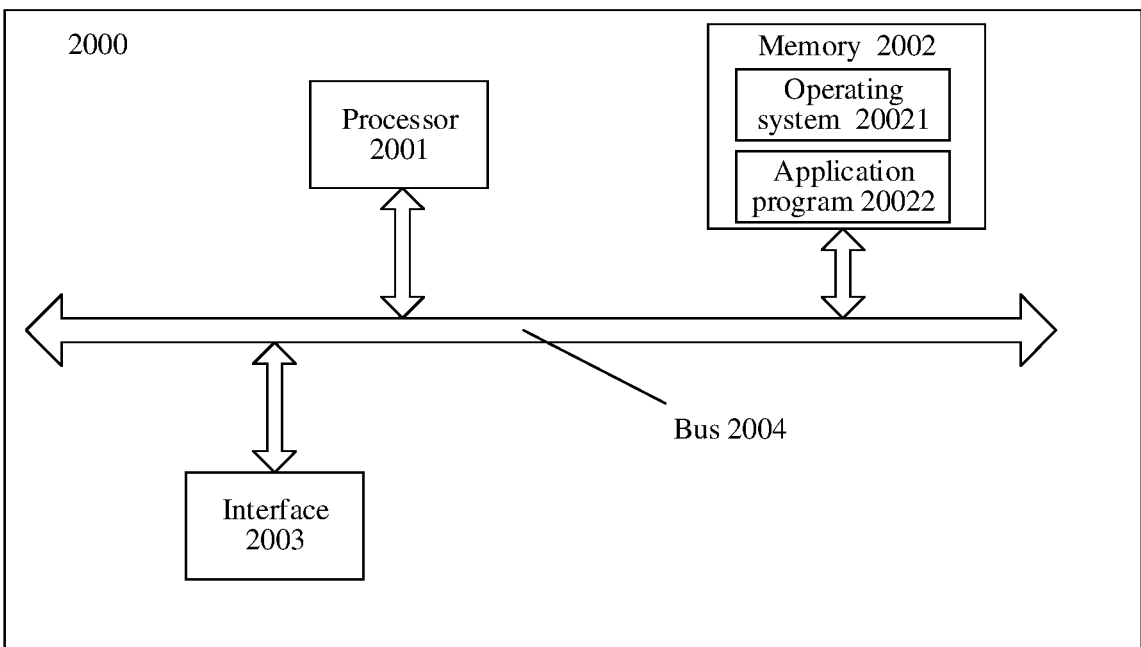
FIG. 10 is a schematic diagram of a hardware structure of a first network device 2000 according to an embodiment of this application.

FIG. 10 is a schematic diagram of a hardware structure of a first network device 2000 according to an embodiment of this application. As shown in FIG. 10, the first network device 2000 may perform corresponding steps performed by the first network device in the methods in the foregoing embodiments.

As shown in FIG. 10, the first network device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is configured to enable the first network device to implement the foregoing receiving and sending. For example, the interface 2003 is configured to receive a BIER packet sent by a second network device, or is configured to send a data packet to a destination device of the data packet corresponding to a first VPN.

The processor 2001 is configured to perform processing performed by the first network device in the foregoing embodiments, for example, is configured to determine, based on a global VPN identifier, the first VPN corresponding to the global VPN identifier, and/or is used in another process of the technology described in this specification. The memory 2002 includes an operating system 20021 and an application program 20022, and is configured to store a program, code, or instructions. When a processor or a hardware device executes the program, the code, or the instructions, a processing process related to the first network device in the method embodiments may be completed. Optionally, the memory 2002 may include a read-only memory (ROM) and a random access memory (RAM). The ROM includes a basic input/output system (BIOS) or an embedded system, and the RAM includes an application program and an operating system. When the first network device 2000 needs to be run, a BIOS built into the ROM or a bootloader in an embedded system in the ROM is used to boot a system to start, to boot the first network device 2000 to enter a normal running state. After entering the normal running state, the first network device 2000 runs the application program and the operating system in the RAM, to complete the processing process of the first network device 2000 in the method embodiments.

It may be understood that FIG. 10 merely shows a simplified design of the first network device 2000. The first network device may include any quantity of interfaces, processors, or memories in actual application.

Figure 11:
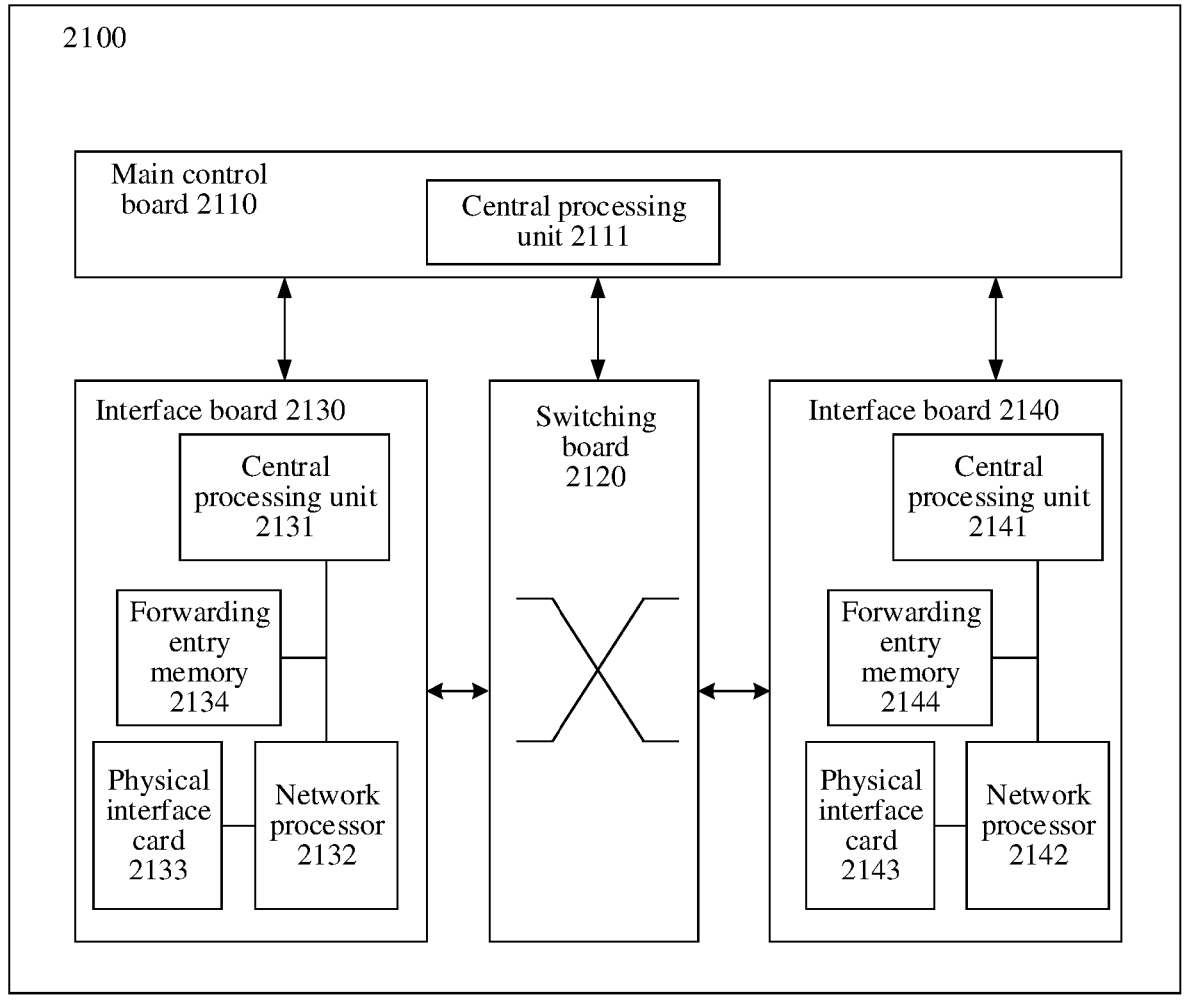
FIG. 11 is a schematic diagram of a hardware structure of a first network device 2100 according to an embodiment of this application.

FIG. 11 is a schematic diagram of a hardware structure of a first network device 2100 according to an embodiment of this application. The first network device 2100 shown in FIG. 11 may perform corresponding steps performed by the first network device in the methods in the foregoing embodiments.

As shown in FIG. 11, the first network device 2100 includes a main control board 2110, an interface board 2130, a switching board 2120, and an interface board 2140. The main control board 2110, the interface board 2130, the interface board 2140, and the switching board 2120 are connected to a platform backboard through a system bus for interworking. The main control board 2110 is configured to complete functions such as system management, device maintenance, and protocol processing. The switching board 2120 is configured to exchange data between interface boards (where the interface board is also referred to as a line card or a service board). The interface boards 2130 and 2140 are configured to: provide various service interfaces (such as a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to: control and manage the interface board, and communicate with a central processing unit on the main control board. The forwarding entry memory 2134 is configured to store an entry, for example, the foregoing BIFT. The physical interface card 2133 is configured to receive and send traffic.

It should be understood that an operation on the interface board 2140 is consistent with an operation on the interface board 2130 in this embodiment of this application. For brevity, details are not described again.

It should be understood that the first network device 2100 in this embodiment may correspond to the functions and/or the various implemented steps in the method embodiments. Details are not described herein again.

In addition, it should be noted that there may be one or more main control boards. When there are a plurality of main control boards, the main control boards may include an active main control board and a standby main control board. There may be one or more interface boards. A first network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first network device may not include a switching board, and the interface board undertakes a service data processing function of an entire system. In a distributed forwarding architecture, the first network device may include at least one switching board, to implement data exchange between a plurality of interface boards, and provide large-capacity data exchange and processing capabilities. Therefore, the data exchange and processing capabilities of the distributed architecture-based first network device are stronger than those of the centralized architecture-based device. A specific architecture that is to be used depends on a specific networking deployment scenario. This is not limited herein.

Figure 12:
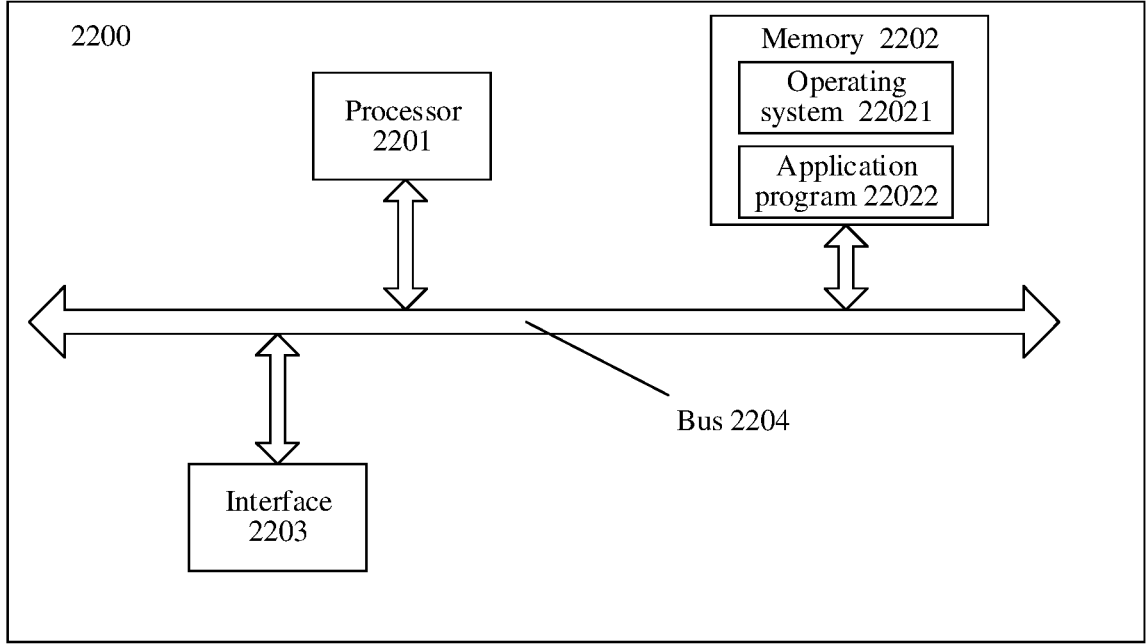
FIG. 12 is a schematic diagram of a hardware structure of a second network device 2200 according to an embodiment of this application.

FIG. 12 is a schematic diagram of a hardware structure of a second network device 2200 according to an embodiment of this application. The second network device 2200 shown in FIG. 12 may perform corresponding steps performed by the second network device in the methods of the foregoing embodiments.

As shown in FIG. 12, the second network device 2200 includes a processor 2201, a memory 2202, an interface 2203, and a bus 2204. The interface 2203 may be implemented in a wireless or wired manner, and may be specifically a network adapter. The processor 2201, the memory 2202, and the interface 2203 are connected through the bus 2204.

The interface 2203 may specifically include a transmitter and a receiver, and is configured to obtain a data packet, send a control packet to a first network device, and send a BIER packet to the first network device. The processor 2201 is configured to perform processing performed by the second network device in the foregoing embodiments. For example, the processor 2201 is configured to determine a correspondence between a global VPN identifier and a second target, and obtain the BIER packet based on the correspondence, where the BIER packet includes the data packet and the global VPN identifier; and/or is used in another process of the technology described in this specification. The memory 2202 includes an operating system 22021 and an application program 22022, and is configured to store programs, code, or instructions. When executing the programs, the code, or the instructions, the processor or a hardware device may complete the processing processes of the second network device in the method embodiments. Optionally, the memory 2202 may include a read-only memory (ROM) and a random access memory (RAM). The ROM includes a basic input/output system (BIOS) or an embedded system, and the RAM includes an application program and an operating system. When the second network device 2200 needs to run, the BIOS built into the ROM or a bootloader in the embedded system in the ROM is used to boot a system to start, to boot the second network device 2200 to enter a normal running state. After entering the normal running state, the second network device 2200 runs the application program and the operating system in the RAM, to complete the processing processes of the second network device 2200 in the method embodiments.

It may be understood that FIG. 12 merely shows a simplified design of the second network device 2200. The second network device may include any quantity of interfaces, processors, or memories in an actual application.

Figure 13:
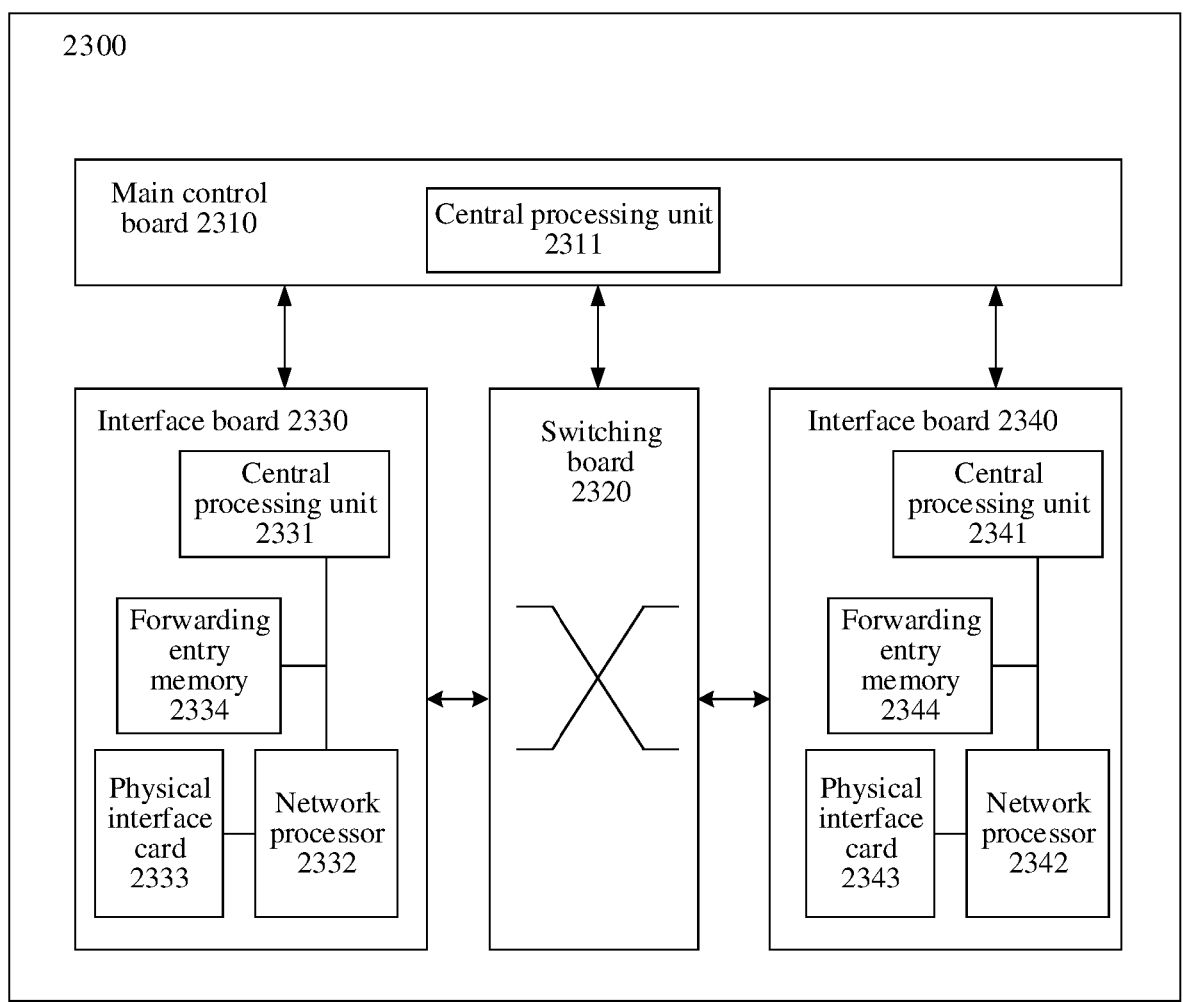
FIG. 13 is a schematic diagram of a hardware structure of a second network device 2300 according to an embodiment of this application.

FIG. 13 is a schematic diagram of a hardware structure of a second network device 2300 according to an embodiment of this application. The second network device 230 shown in FIG. 13 may perform corresponding steps performed by the second network device in the methods in the foregoing embodiments.

As shown in FIG. 13, the second network device 230 includes a main control board 2310, an interface board 2330, a switching board 2320, and an interface board 2340. The main control board 2310, the interface board 2330, the interface board 2340, and the switching board 2320 are connected to a platform backboard through a system bus for interworking. The main control board 2310 is configured to complete functions such as system management, device maintenance, and protocol processing. The switching board 2320 is configured to exchange data between interface boards (where the interface board is also referred to as a line card or a service board). The interface boards 2330 and 2340 are configured to: provide various service interfaces (such as a POS interface, a GE interface, and an ATM interface), and forward a data packet.

The interface board 2330 may include a central processing unit 2331, a forwarding entry memory 2334, a physical interface card 2333, and a network processor 2332. The central processing unit 2331 is configured to: control and manage the interface board, and communicate with a central processing unit on the main control board. The forwarding entry memory 2334 is configured to store an entry, for example, the foregoing BIFT. The physical interface card 2133 is configured to receive and send traffic.

It should be understood that an operation on the interface board 2340 is consistent with an operation on the interface board 2330 in this embodiment of this application. For brevity, details are not described again. It should be understood that the second network device 2300 in this embodiment may correspond to the functions and/or the various implemented steps in the method embodiments. Details are not described herein again.

In addition, it should be noted that there may be one or more main control boards. When there are a plurality of main control boards, the main control boards may include an active main control board and a standby main control board. There may be one or more interface boards. A second network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the second network device may not include a switching board, and the interface board undertakes a service data processing function of an entire system. In a distributed forwarding architecture, the second network device may include at least one switching board, to implement data exchange between a plurality of interface boards, and provide large-capacity data exchange and processing capabilities. Therefore, the data exchange and processing capabilities of the second network device in the distributed architecture are stronger than those of the centralized architecture-based device. A specific architecture that is to be used depends on a specific networking deployment scenario. This is not limited herein.

An embodiment of this application further provides a computer-readable medium. The computer-readable medium stores program code. When the computer program code is run on a computer, the computer is enabled to perform the method performed by the first network device. The computer-readable storage includes but is not limited to one or more of the following: a read-only memory (ROM), a programmable ROM (PROM), an erasable PROM (EPROM), a flash memory, an electrically EPROM (EEPROM), and a hard drive.

An embodiment of this application further provides a computer-readable medium. The computer-readable medium stores program code. When the computer program code is run on a computer, the computer is enabled to perform the method performed by the second network device. The computer-readable storage includes but is not limited to one or more of the following: a read-only memory (ROM), a programmable ROM (PROM), an erasable PROM (EPROM), a flash memory, an electrically EPROM (EEPROM), and a hard drive.

An embodiment of this application further provides a chip system used in a first network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first network device in the methods in the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides another chip system used in a second network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the second network device in the methods in the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides a computer program product used in a first network device. The computer program product includes a series of instructions, and when the instructions are executed, operations of the first network device in the methods in the foregoing aspects are performed.

An embodiment of this application further provides a computer program product used in a second network device. The computer program product includes a series of instructions, and when the instructions are executed, operations of the second network device in the methods in the foregoing aspects are performed.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a first network device, a bit indexed explicit replication (BIER) packet sent by a second network device, wherein the BIER packet comprises a data packet and a global virtual private network (VPN) identifier, the global VPN identifier uniquely identifies, in a BIER domain, a VPN to which a source device of the data packet belongs, the global VPN identifier comprises an identifier of the second network device and a first identifier, the identifier of the second network device identifies the second network device in the BIER domain, the first identifier identifies, on the second network device, the VPN to which the source device of the data packet belongs, the second network device is an ingress node of the BIER domain, and the first network device is an egress node of the BIER domain;
determining, by the first network device based on the global VPN identifier, a first VPN corresponding to the global VPN identifier, wherein the first VPN is determined by the first network device as a VPN to which a destination device of the data packet belongs; and
sending, by the first network device, the data packet to the destination device of the data packet corresponding to the first VPN; and wherein the identifier of the second network device comprises any one of the following: an internet protocol version 4 (IPv4) address of the second network device, an internet protocol version 6 (IPv6) address of the second network device, a prefix of the IPv6 address of the second network device, or a media access control (MAC) address of the second network device.

2. The method according to claim 1, further comprising:
receiving, by the first network device, a control packet, wherein the control packet comprises the global VPN identifier and a second route target attribute;
determining, by the first network device, a first route target attribute based on the control packet, wherein the first route target attribute corresponds to the second route target attribute; and
determining, by the first network device, a correspondence between the global VPN identifier and the first VPN based on a correspondence between the first route target attribute and the first VPN on the first network device.

3. The method according to claim 1, further comprising:
determining, by the first network device based on a protocol field in a BIER header of the BIER packet, that the BIER packet comprises the global VPN identifier.

4. The method according to claim 3, wherein the global VPN identifier is located in the BIER packet after the BIER header.

5. The method according to claim 1, wherein sending, by the first network device, the data packet to the destination device of the data packet corresponding to the first VPN comprises:
decapsulating, by the first network device, the BIER packet to obtain the data packet; and
sending, by the first network device, the data packet to the destination device of the data packet corresponding to the first VPN.

6. The method according to claim 1, wherein the identifier of the second network device comprises the IPv4 address of the second network device.

7. The method according to claim 1, wherein the identifier of the second network device comprises the IPv6 address of the second network device.

8. The method according to claim 1, wherein the identifier of the second network device comprises the prefix of the IPv6 address of the second network device.

9. The method according to claim 1, wherein the identifier of the second network device comprises the media access control (MAC) address of the second network device.

10. A method, comprising:
determining, by a second network device, a correspondence between a global virtual private network (VPN) identifier and a second route target attribute, wherein the global VPN identifier uniquely identifies, in a bit indexed explicit replication (BIER) domain, a VPN to which a source device of a data packet belongs, the global VPN identifier comprises an identifier of the second network device and a first identifier, the identifier of the second network device identifies the second network device in the BIER domain, the first identifier identifies, on the second network device, the VPN to which the source device of the data packet belongs, and the second network device is an ingress node of the BIER domain;
sending, by the second network device, a control packet to a first network device, wherein the control packet comprises the global VPN identifier and the second route target attribute, and the first network device is an egress node of the BIER domain;

obtaining, by the second network device, the data packet, wherein the VPN to which the source device of the data packet belongs corresponds to the second route target attribute;

obtaining, by the second network device, a BIER packet based on the correspondence, wherein the BIER packet comprises the data packet and the global VPN identifier; and sending, by the second network device, the BIER packet to the first network device; and wherein the identifier of the second network device comprises any one of the following: an internet protocol version 4 (IPv4) address of the second network device, an internet protocol version 6 (IPv6) address of the second network device, a prefix of the IPv6 address of the second network device, or a media access control (MAC) address of the second network device.

11. The method according to claim 10, wherein a protocol field in a BIER header of the BIER packet indicates that the BIER packet comprises the global VPN identifier.

12. The method according to claim 10, wherein the global VPN identifier is located in the BIER packet after a BIER header.

13. A first network device, comprising:

a non-transitory memory storing instructions; and at least one processor coupled to the non-transitory memory, wherein the instructions, when executed by the at least one processor, cause the first network device to be configured to:

receive a bit indexed explicit replication (BIER) packet sent by a second network device, wherein the BIER packet comprises a data packet and a global virtual private network (VPN) identifier, the global VPN identifier uniquely identifies, in a BIER domain, a VPN to which a source device of the data packet belongs, the global VPN identifier comprises an identifier of the second network device and a first identifier, the identifier of the second network device identifies the second network device in the BIER domain, the first identifier identifies, on the second network device, the VPN to which the source device of the data packet belongs, the second network device is an ingress node of the BIER domain, and the first network device is an egress node of the BIER domain;

determine, based on the global VPN identifier, a first VPN corresponding to the global VPN identifier, wherein the first VPN is a VPN that is determined by the first network device to which a destination device of the data packet belongs; and send the data packet to the destination device of the data packet corresponding to the first VPN; and wherein the identifier of the second network device comprises any one of the following: an internet protocol version 4 (IPv4) address of the second network device, an internet protocol version 6 (IPv6) address of the second network device, a prefix of the IPv6 address of the second network device, or a media access control (MAC) address of the second network device.

14. The first network device according to claim 13, wherein the instructions, when executed by the at least one processor, further cause the first network device to be configured to:

receive a control packet, wherein the control packet comprises the global VPN identifier and a second route target attribute;

determine a first route target attribute based on the control packet, wherein the first route target attribute corresponds to the second route target attribute; and determine a correspondence between the global VPN identifier and the first VPN based on a correspondence between the first route target attribute and the first VPN on the first network device.

15. The first network device according to claim 13, wherein the instructions, when executed by the at least one processor, further cause the first network device to be configured to:

determine, based on a protocol field in a BIER header of the BIER packet, that the BIER packet comprises the global VPN identifier.

16. The first network device according to claim 15, wherein the global VPN identifier is located in the BIER packet after the BIER header.

17. The first network device according to claim 13, wherein the instructions, when executed by the at least one processor, further cause the first network device to be configured to:

decapsulate the BIER packet to obtain the data packet.

18. A second network device, comprising:

a non-transitory memory storing instructions; and at least one processor coupled to the non-transitory memory;

wherein the instructions, when executed by the at least one processor, cause the second network device to be configured to:

determine a correspondence between a global virtual private network (VPN) identifier and a second route target attribute, wherein the global VPN identifier uniquely identifies, in a bit indexed explicit replication (BIER) domain, a VPN to which a source device of a data packet belongs, the global VPN identifier comprises an identifier of the second network device and a first identifier, the identifier of the second network device identifies the second network device in the BIER domain, the first identifier identifies, on the second network device, the VPN to which the source device of the data packet belongs, and the second network device is an ingress node of the BIER domain;

send a control packet to a first network device, wherein the control packet comprises the global VPN identifier and the second route target attribute, and the first network device is an egress node of the BIER domain; and obtain the data packet, wherein the VPN to which the source device of the data packet belongs corresponds to the second route target attribute, wherein obtain a BIER packet based on the correspondence, wherein the BIER packet comprises the data packet and the global VPN identifier; and send the BIER packet to the first network device; and wherein the identifier of the second network device comprises any one of the following: an internet protocol version 4 (IPv4) address of the second network device, an internet protocol version 6 (IPv6) address of the second network device, a prefix of the IPv6 address of the second network device, or a media access control (MAC) address of the second network device.

19. The second network device according to claim 18, wherein a protocol field in a BIER header of the BIER packet indicates that the BIER packet comprises the global VPN identifier.

20. The second network device according to claim 18, wherein the global VPN identifier is located in the BIER packet after a BIER header.

\*   \*   \*   \*   \*